June 15, 1965  E. CHAPMAN  3,189,150
MAGNETIC CLUTCH

Filed July 25, 1962  3 Sheets-Sheet 1

INVENTOR.
Everett Chapman,
BY Parker & Carter
Attorneys.

June 15, 1965 E. CHAPMAN 3,189,150
MAGNETIC CLUTCH
Filed July 25, 1962 3 Sheets-Sheet 3
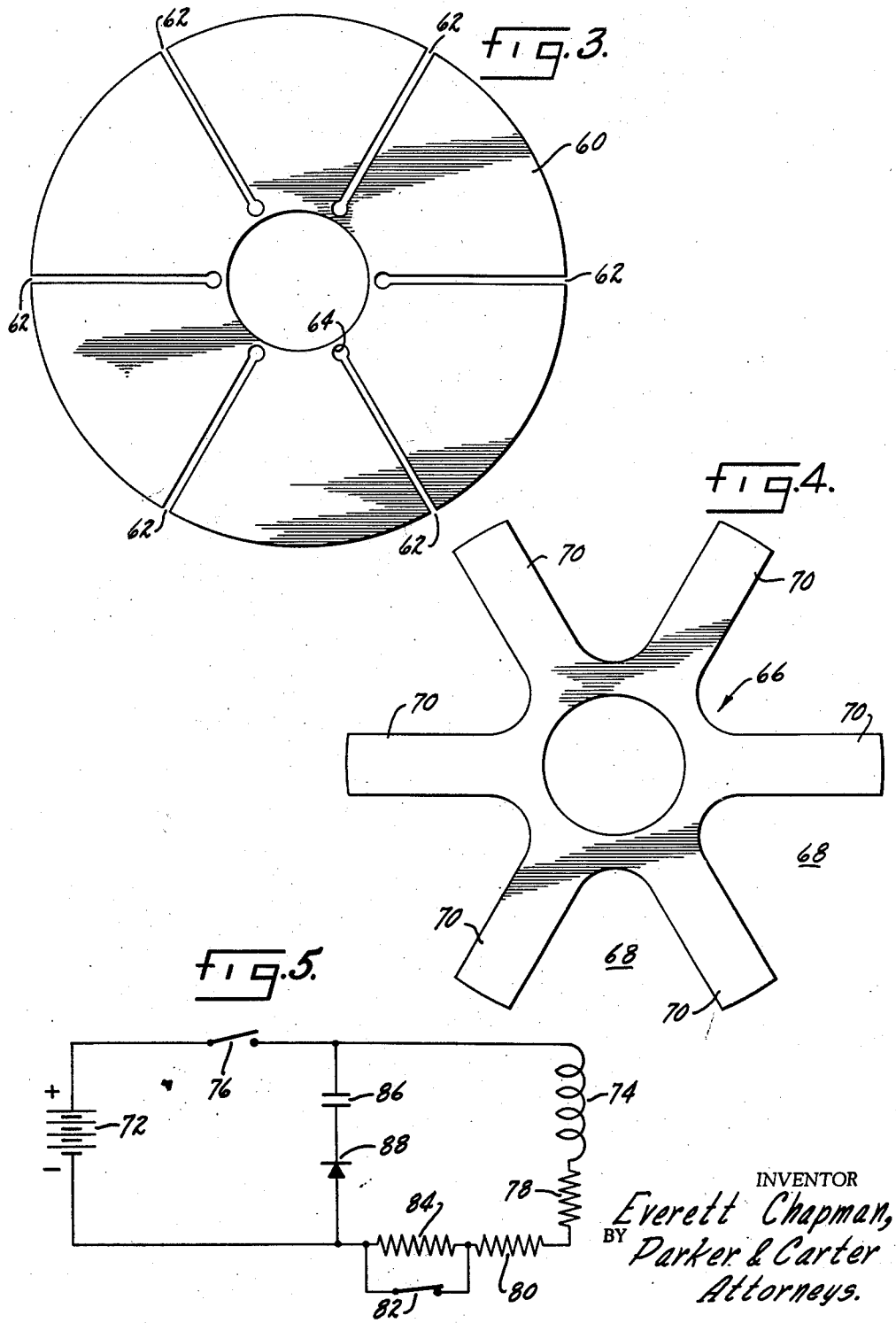
INVENTOR
Everett Chapman,
BY Parker & Carter
Attorneys.

United States Patent Office 3,189,150
Patented June 15, 1965

3,189,150
MAGNETIC CLUTCH
Everett Chapman, West Chester, Pa., assignor to Nordberg Manufacturing Company, Milwaukee, Wis., a corporation of Wisconsin
Filed July 25, 1962, Ser. No. 212,345
7 Claims. (Cl. 192—84)

This is a continuation-in-part of Serial No. 57,184, filed September 20, 1960, now abandoned.

This invention relates to an improved magnetic clutch.

A primary purpose of the invention is a magnetic clutch having fast operating time.

Another purpose is a magnetic clutch of the type described in which one of the rotating clutch elements is in the form of a flywheel having a large mass.

Another purpose is an improved magnetic clutch for use in coupling a rotating shaft to a relatively stationary shaft and for transmitting a large torque from the rotating shaft to the stationary shaft simultaneously with the closing of the clutch.

Another purpose is a magnetic clutch of the type described having improved wearability.

Another purpose is an improved magnetic clutch having highly efficient operating characteristics.

Another purpose is a magnetic clutch arranged for quick disengagement.

Other purposes will appear in the ensuing specification, drawings and claims.

The invention is illustrated diagrammatically in the following drawings wherein:

FIGURES 3 and 4 are plan views of various forms of armature support plates; and

FIGURE 5 is an electrical circuit diagram of the clutch elements.

Figure 1:
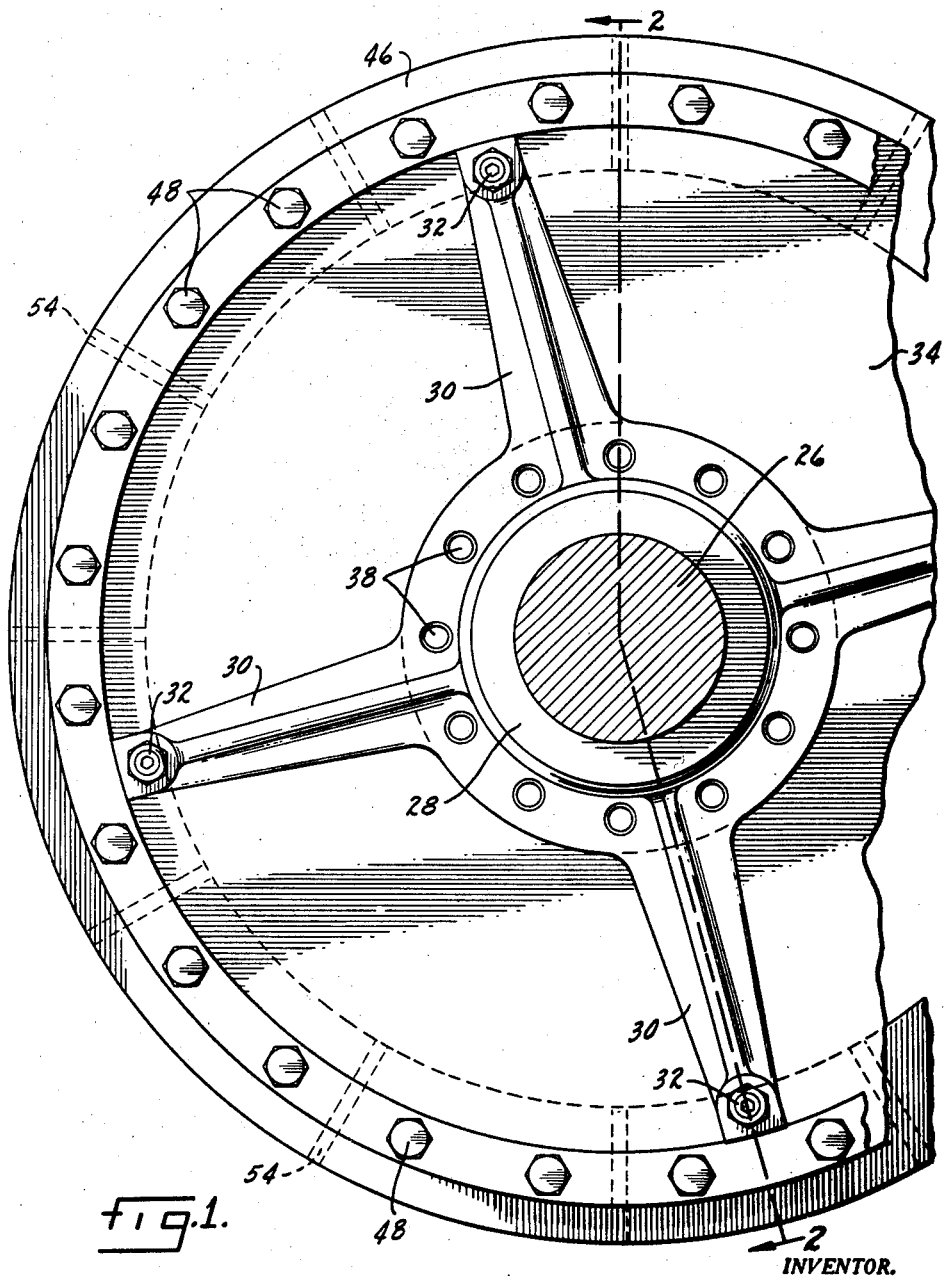
FIGURE 1 is an end view, from the left-hand side of FIGURE 2, showing a clutch of this invention.
Figure 2:
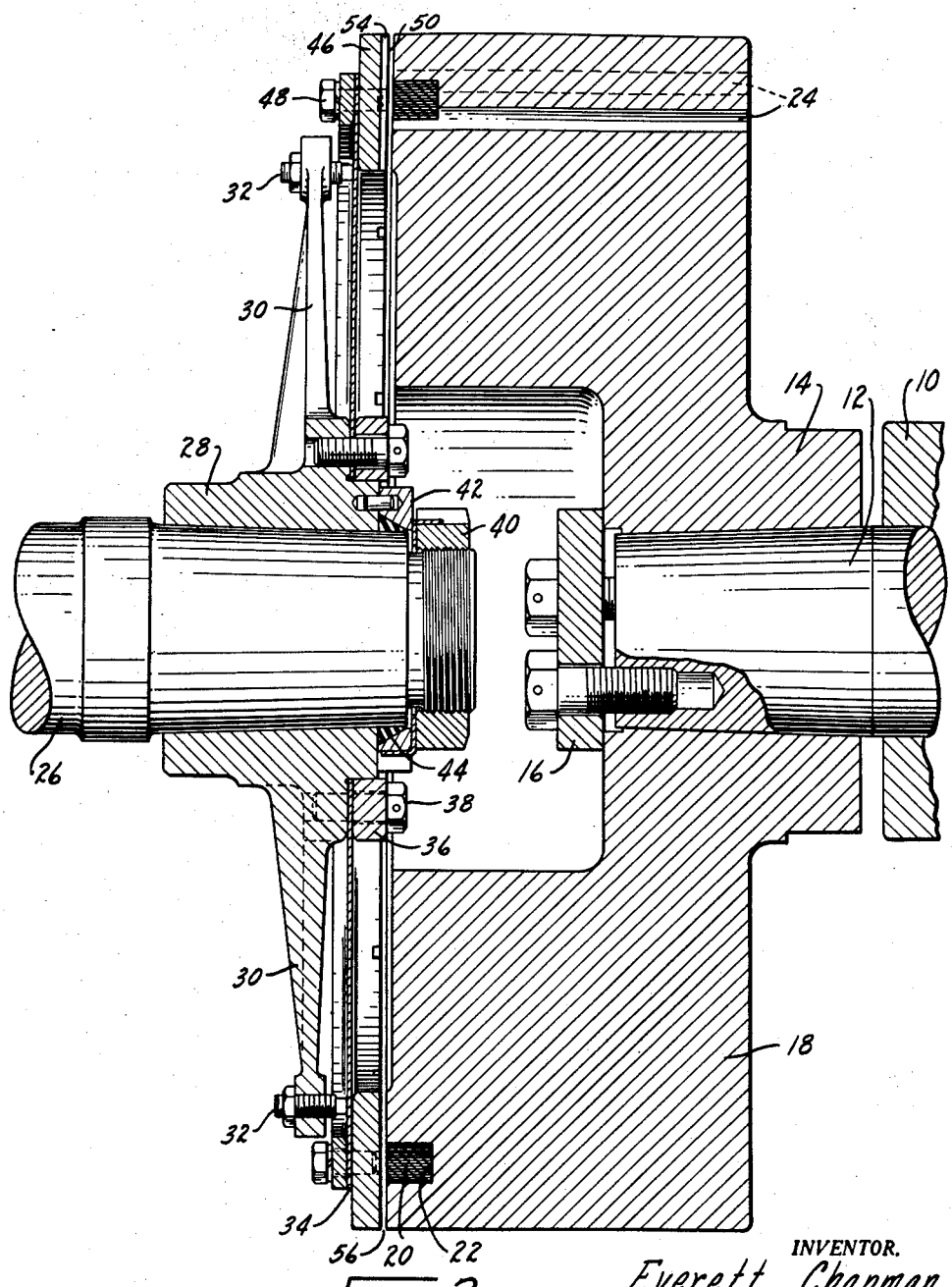
FIGURE 2 is a section along plane 2—2 of FIGURE 1.

In FIGURE 2, a starting-generating dynamo is indicated diagrammatically at 10. The term "starting-generating dynamo" is meant to include any type of unit which functions both as a generator and as a motor. For example, a single machine may be wired to operate both as a generator and as a motor, or there may be a separate alternator and a separate motor. In addition, the term includes an alternator and a motor exciter. The novelty of this invention does not reside in this unit, and any machine or unit or combination of units or machines may be used which is effective to operate as a motor when supplied with electric current and to operate as a generator when driven by a suitable prime mover.

A shaft 12 extends outwardly from the unit 10 and fixedly mounts a high inertia flywheel or clutch member 14 which may be formed of a suitable magnetic material, preferably ductile iron, although it may be otherwise. The clutch member 14 is pressed on the shaft 12 with a taper fit and held by an end plate 16 which overlaps and covers a portion of the clutch member. The plate 16 may be bolted or otherwise suitably secured to the shaft 12. The clutch member 14 preferably has a large mass concentrated at a point spaced from its axis of rotation, such that when rotating, it constitutes a large reservoir of energy. The larger portion 18 of the flywheel extends axially beyond the end of the shaft 12 toward the crankshaft 26 of the engine which is associated with the unit 10.

In order to develop a magnetic field in the member 14, a suitable electric coil 20, which may be a circumferentially wound insulated copper tape, is positioned in a groove 22 formed adjacent the outer periphery of the flywheel and opening through the exposed face. It is preferred to have the magnetic field adjacent the outside of the flywheel to thus provide a larger total area for the magnetic field and hence greater contact areas and hence maximum torque carrying capacity. Slip rings and brushes are provided to excite the coil electrically. Suitable slots or holes 24 may be formed in the flywheel to provide the electrical connections for the coil 20. Although the coil may take a number of forms, it is preferred to use a thin copper tape with layers of insulation interposed between each layer. The coil will form a magnetic field in that portion of the flywheel adjacent the groove. The coil is preferably potted or sealed into the groove 22 by a suitable resin. In this connection, the sides of the groove 20 should be rough cut to form a good anchor for the resin.

The shaft 26, which may be the crankshaft or a shaft connected to the crankshaft of an internal combustion engine, has a hub 28 fixed thereto. Coupled with the hub 28 are a plurality, in this case four, of radially extending arms 30 which have adjusting screws 32 or the like mounted at their outward radial ends. A circular plate 34 or the like, preferably flexible and springlike, is fixed on the hub 28 and to the radial arms 30 by a collar 36 and screws 38 or the like. A nut 40 may be threaded on the end of the shaft 26 and is used to hold the hub 28 in position through a spacer 42 or the like which is sealed to the shaft 26 by a seal ring 44.

A steel or magnetic armature 46, generally in the form of a ring or annulus, is mounted on the plate 34 adjacent its outer periphery by means of a plurality of screws 48 or the like. Preferably, the surface 50 of the armature which opposes the flywheel 14 is divided by radially extending slots 54. These slots are particularly advantageous in reducing induced currents in the armature which oppose the flux buildup in the magnetic circuit. These induced currents or bucking currents oppose the magnetic force of attraction of the flywheel.

The armature 46 is spaced from the flywheel 14 a distance 56 which is the air gap. The air gap 56 is variable and is set by moving the units toward or away from each other.

The adjusting screws 32 may be used to preload the spring plate 34 and to thus establish more wear-away force. By using a biased or preload spring plate, the disengagement time of the clutch will be brought down to a minimum. Although it will take a large number of ampere turns to close the clutch, once it is closed, the holding force or running ampere turns can be substantially reduced because there is then no air gap, but a completely closed magnetic circuit. In any event, with a preloaded spring plate, we can have a higher spring force and hence a larger disengaging force. With a preloaded spring we can have a higher disengaging force for a specified air gap than would be possible with no preloading.

FIGURES 3 and 4 show various modified forms of support plates for the armature. In FIGURE 3 a plate 60 may have a plurality of radially extending slots 62 which run from the outer periphery of the plate toward the center and end in an enlarged generally circular hole 64.

In FIGURE 4 a plate 66 may have a plurality of radial wedge shaped segments removed to leave open areas 68. The plate is actually composed of a plurality of radially extending arms 70, separated by the wedge shaped segments 68.

One of the problems that has been encountered in clutches of the type shown herein is that the engine heat may cause the plate supporting the armature to expand in a direction toward the flywheel or clutch member. Thus, it may be impossible to disengage the clutch, as the armature is held against the flywheel by its support plate and not by the magnetic field. To cure this problem, it is proposed to form the plate 34, or any of the other modified plates used to support the armature, of a material which has substantially a zero coefficient of thermal expansion over a wide range of temperatures. One example of such a material is that sold under the trademark Invar having a zero coefficient of thermal expansion from approximately −70° F. to approximately 300° F. In this connection, the hub 28 and arms 30 may also be made of Invar to further reduce any effect caused by engine heat. Another way to reduce the temperature gradient is to form the hub 28 and arms 30 of a high heat conductive material. Aluminum is satisfactory as is beryllium copper which has a high heat conductivity and good strength.

FIGURE 5 illustrates the electrical circuit of the clutch. A battery or other source of electrical current 72 may be connected to the coil 74 through an operating switch 76. The resistance of the coil 74 is indicated at 78 and the resistance of the slip rings is shown at 80. The ampere turns required to close the clutch by moving the armature through the air gap is quite large. But once the clutch faces are in contact, the magnetic circuit is through metal-to-metal contact and is not required to bridge the air gap, so the ampere turns required to keep the clutch closed is quite small, compared to what is required to close it. A time delay switch 82 may be placed in parallel with a current limiting resistor 84, with the switch 82 being set to time out and open a predetermined time after starting. One example of the operating characteristics would be to use a starting current of 15 amps. and a running current of 1.5 amps. with the switch 82 set to time out in one second.

A capacitor 86 and a diode 88 may be placed in parallel with the coil 74 to advance collapse of the magnetic field upon disengagement of the clutch. During the start and normal running the diode 88 will prevent capacitor 86 from charging. As soon as switch 76 is opened, the magnetic field in coil 74 will collapse and capacitor 86 will take on the charge.

Another possibility is instead of using the capacitance 86 and diode 88, I might make resistance 84 of sufficient magnitude or of the proper material to quickly dampen out the oscilliations when the switch 76 is open. As the field in coil 74 collapses, the oscillations of the back E.M.F. will be quickly dampened out. For example, each cycle of the back E.M.F. may handle approximately 10% of the magnitude of the previous cycle. The result will be that the attractive force of the collapsing field will quickly become very small.

The use, operation and function of the invention are as follows:

Shown and described herein is an improved magnetic clutch for connecting a driven shaft with a driving shaft. The clutch includes a flywheel or high inertia member as one of its elements. The inertia member is fixed on the driving shaft or driven by the driving shaft so that as soon as the clutch or coupling is completed, energy from the rotating member is immediately transferred to the driven shaft. The clutch has been shown in such a manner that the flywheel or clutch member is mounted directly on the driving shaft. In some applications, the clutch member or flywheel may be freely rotatable on the driven shaft, and still be connected to the driving shaft. For one example of such a construction, see U.S. Patent 2,972,056.

Clutches of the type shown have particular application in remote power plants, although the invention should not be limited to this particular use. The unit 10 may illustrate a starting-generating dynamo which may be a unit wired to act both as a generator and as a motor. In any event, the unit 10 diagrammatically illustrates a machine or unit which will operate both as a motor and as a generator. The crankshaft 26 may represent a standby engine which is used to drive the unit 10 in the event of failure of the normal power supply. The standby engine may be any one of a variety of internal combustion engines, for example oil, gasoline, dual fuel, or even a gas turbine.

In normal use, the machine 10 is operated as a motor and is being supplied with electric current from the normal power supply. The machine 10 turns the flywheel mounted on the shaft 12. In the event of interruption in the normal electrical power supply, the switching gear, for example switch 76, immediately supplies a small D.C. voltage to the coil. A magnetic field is developed in the flywheel which quickly pulls the armature toward the flywheel to couple the shaft 12 with the crankshaft 26. Some energy of the flywheel will be immediately transferred to the crankshaft 26 to start the engine. The engine will be brought up to speed in a minimum number of revolutions. During the short interval that the power is off and there is no drive for the generator 10, the flywheel 14 will provide sufficient energy to rotate the generator so that a substantially continuous supply of electrical energy will be provided. As soon as the standby engine is up to speed it drives the generator. The clutch will remain in the operated condition at reduced current until normal power is restored.

The invention may be used at remotely located radio relay stations which transmit telephone conversations, television programs and defense communications. The invention may also be used in pumping stations, hospitals, civil defense locations, and other installations which cannot tolerate any interruption of electrical power or other emergency services.

As a specific example of the materials which are suitable for use in the clutch, the flywheel may be formed of a ferritic nodular cast iron which has the advantage of both providing increased magnetic properties and a non-galling surface to resist scoring and grooving by the armature. The armature may be a leaded steel which has the advantage of good non-galling characteristics with only a slight decrease in its magnetic property. A further feature of the invention is a coating on the armature in the nature of a thin, for example 1/32", layer of a wearing material, such as bronze or the like. In this case the air gap would be reduced or the coil designed, if necessary, to provide the proper magnetic pull. The layer of bronze or other wearing material should be so thin that the magnetic properties of the armature are not materially reduced.

Although the magnetic coil has been shown as a circumferentially wound coil, it should be realized that it is also possible to use a number of separate individual coils which are circumferentially spaced around the flywheel in opposition to the armature. These individual coils could be copper tape, a thin gauge wire or otherwise. The magnetic coil could also be mounted on the movable member or armature, in which case the flywheel could have an axially aligned portion formed of a good magnetic material.

The diode-condenser combination shown in FIGURE 5 hastens the collapse of the magnetic field and hence speeds clutch disengagment. The condenser remains uncharged until the clutch is released. The magnetic field in the coil then collapses and charges the condenser. The uncharged condenser enables the coil field to quickly collapse.

Quick clutch disengagement is important so that engine compression will not drag down the speed of the generator. Preloading the spring plate mounting of the armature permits the use of a higher spring force and hence a higher disengaging force.

A higher starting ampere turn will be necessary to engage the clutch, but this presents no problem, especially since running current is substantially reduced over the starting current. A further important factor on clutch release is engine heat. By forming the armature mounting plate out of a material that has substantially no expansion over a wide range of temperatures, distortion and warpage due to engine heat are eliminated.

Whereas the preferred form of the invention has been shown and described herein, it should be realized that there are many modifications, substitutions and alterations thereto, within the scope of the invention.

I claim:

1. A magnetic clutch for coupling two shafts together, including a first clutch member adapted to be mounted on one of the shafts, an electric coil mounted on the clutch member adjacent its outer periphery, a second clutch member adapted to be mounted on the other shaft and having a generally annular disc-like armature positioned in generally axial alignment with the coil and normally spaced somewhat from it, a spring mounting for said armature and means for preloading said spring mounting to apply a peripheral uniform axial bias to the armature, a circuit for supplying starting current to the coil to form a magnetic field therein and to thereby move the armature into contact with the first clutch member, means for advancing the collapse of the magnetic field in the coil and the release of the armature from the first clutch member when the circuit is broken for disengagement of the clutch including a condenser in parallel with the coil and a diode in series with the condenser to prevent charging of the condenser when the coil is energized by the circuit, and means for reducing the current in the coil to a fraction of its starting value after engagement of the armature and first clutch member including a resistor in circuit with the coil and a time delay switch in parallel with the resistor.

2. The structure of claim 1 further characterized by and including an inertia member formed integrally with the first clutch member.

3. The structure of claim 1 further characterized in that the armature is spring mounted on flexible arms.

4. The structure of claim 1 further characterized by a circumferential groove near the outer periphery of the first clutch member, and a coil formed of a copper tape positioned in the groove.

5. The structure of claim 1 further characterized in that the face of the armature opposing the first clutch member is divided into segments.

6. The structure of claim 1 further characterized in that the face of the armature opposing the first clutch member has a wear resistant facing layer.

7. A magnetic clutch for coupling two shafts together, including a first clutch member adapted to be mounted on one of the shafts, an electric coil mounted on the clutch member adjacent its outer periphery, a second clutch member adapted to be mounted on the other shaft and having a generally annular disc-like armature positioned in generally axial alignment with the coil and normally spaced somewhat from it, a spring mounting for said armature and means for preloading the spring mounting to apply a peripheral uniform axial bias to the armature, said armature being spring mounted on flexible arms, the arms being formed of a material having a substantially zero coefficient of thermal expansion over a temperature range of approximately −70 degrees F. to approximately 300 degrees F., a circuit for supplying starting current to the coil to form a magnetic field therein and to thereby move the armature into contact with the first clutch member, and means for reducing the current in the coil to a fraction of its starting value after engagement of the armature and first clutch member including a resistor in circuit with the coil and a time delay switch in parallel with the resistor.

References Cited by the Examiner

UNITED STATES PATENTS

| | | |
|---|---|---|
| 1,491,426 | 4/24 | Schunemann. |
| 1,622,261 | 3/27 | Payne. |
| 2,395,772 | 2/46 | Winther. |
| 2,567,636 | 9/51 | Cuny _____ 322—4 X |
| 2,637,769 | 5/53 | Walker. |
| 2,710,947 | 6/55 | Gaston _____ 336—60 |
| 2,718,951 | 9/55 | Mason _____ 192—84 |
| 2,880,595 | 4/59 | McGuffey et al. |
| 2,912,963 | 11/59 | Dufresne. |
| 2,972,056 | 2/61 | Park et al. |
| 3,077,541 | 2/63 | Valus _____ 322—4 X |

OTHER REFERENCES

Circular of the Bureau of Standards, #58, 2nd ed., June 22, 1923, "Invar and Related Metals" (copy available in Patent Office Scientific Library).

DAVID J. WILLIAMOWSKY, *Primary Examiner.*

ROBERT C. RIORDON, *Examiner.*